United States Patent [19]

Sweetser

[11] Patent Number: 5,168,372
[45] Date of Patent: Dec. 1, 1992

[54] VIDEO CONTROL SYSTEM

[76] Inventor: David J. Sweetser, 8135 Turman Ct., Fort Collins, Colo. 80525

[21] Appl. No.: 620,534

[22] Filed: Nov. 29, 1990

[51] Int. Cl.[5] .......................................... H04N 7/167
[52] U.S. Cl. ................................. 358/349; 455/26.1; 380/3; 358/84
[58] Field of Search .................. 340/825.31; 455/2, 4, 455/26.1; 358/349, 188, 84; 307/140, 141; 380/3, 4, 52

[56]  References Cited

U.S. PATENT DOCUMENTS

| | | | |
|---|---|---|---|
| 3,581,029 | 5/1971 | Noiles . | |
| 3,833,779 | 9/1974 | Leone . | |
| 3,879,332 | 4/1975 | Leone . | |
| 4,145,617 | 3/1979 | Lee et al. | 307/141 X |
| 4,246,495 | 1/1981 | Pressman . | |
| 4,317,213 | 2/1982 | DiLorenzo . | |
| 4,348,696 | 9/1982 | Beier . | |
| 4,358,672 | 11/1982 | Hyatt et al. | 358/349 X |
| 4,510,623 | 4/1985 | Bonneau et al. . | |
| 4,566,033 | 1/1986 | Reidenour . | |
| 4,588,901 | 5/1986 | Maclay et al. . | |
| 4,718,107 | 1/1988 | Hayes | 358/349 X |
| 4,956,825 | 9/1990 | Wilts et al. . | |
| 5,051,837 | 9/1991 | McJunkin | 358/349 |
| 5,053,884 | 10/1991 | Kamijyo | 358/349 |
| 5,060,079 | 10/1991 | Rufus-Isaacs | 358/349 |

OTHER PUBLICATIONS

Owner's Guide Model No. 10683 VHS VCR Montgomery Ward, 1986.

Primary Examiner—Tod R. Swann

[57]  ABSTRACT

A video viewing control system which permits the parent to enter a viewing "allowance" (time) for each child and which disables viewing of a television by disrupting the television's Radio Frequency (RF) input signal or video input signal when the child has watched television for his allowable time. The system includes a single chip microprocessor and a liquid crystal display which permits display of graphical symbols to the child for easy comprehension. The system is battery powered to protect against power outages. The child's viewing time can be set on a daily basis (potentially different for each day of the week) or can be done on a weekly basis (a lump-sum covering the entire week). Block out times (during which television viewing is disabled) can be programmed for each child on the hour and half-hour for any day of the week. The system calculates and displays each child's average viewing time per day and the total viewing time over any desired period.

4 Claims, 7 Drawing Sheets

VIDEO CONTROL SYSTEM

FIELD OF THE INVENTION

The present invention relates in general to control devices and systems for automatically enabling or disabling viewing of a television set or video devices by disrupting the television's RF or video input signal. More specifically, the invention relates to a control device or system that limits the daily or weekly viewing time of several viewers to a predetermined length of time and to predetermined periods during the week.

BACKGROUND OF THE INVENTION

It is widely acknowledged that children spend excessive time viewing television and that this has resulted in lower scholastic achievement and lessened social development. Such viewing includes not only broadcast television, but also time spent playing video games, watching video cassettes, etc. Compounding the problem is the fact that children are often home along without parental supervision. While a number of devices have been patented which attempt to address the problem of excessive television viewing, they suffer from several drawbacks. The objective of this invention is to address these drawbacks by providing a viewing control device that is extremely cost-effective, very simple to use, and that can be attached to any television set without modification to the set.

The prior art includes several devices which attempt to control television viewing. For example, U.S. Pat. No. 4,510,623 (Bonneau), describes a device which is incorporated into the television set and can be programmed to inhibit viewing of certain channels. However, this device must be designed into the television set and therefore cannot be used with the tens of millions of television sets already in use.

U.S. Pat. No. 4,566,033 (Reidenouer), describes an apparatus which uses magnetic tokens to activate a timer which controls power to the television. However, because many modern televisions are programmable, switching the television's power will require that the television be re-programmed each time it is turned on. Furthermore, the apparatus does not have the capability to inhibit viewing at selectable times of the day nor does it have the capability to automatically impose, for each day of the week, a limit in the allowable number of viewing hours.

U.S. Pat. No. 4,588,901 (Maclay et. al.) describes an apparatus which acts a s a timer and which controls power to the television. As described previously, disrupting power to modern televisions often necessitates re-programming of the television. Furthermore, the apparatus has no capability to provide multiple children with a unique number of viewing hours nor does it have the capability to inhibit viewing at selectable times of the day.

U.S. Pat. No. 4,956,825 (Wilts et. al.) describes an apparatus which keeps track of the number of hours an appliance is used and displays this number. When a pre-set number of hours is exceeded, the apparatus flashes the display to alert the parents. Therefore, this apparatus requires parental intervention to inhibit further viewing. Furthermore, the apparatus has no capability to provide multiple children with a unique number of viewing hours nor does it have the capability to inhibit viewing at selectable times of the day.

U.S. Pat. No. 4,348,696 (Beier) describes an apparatus which does provide multiple children with a programmable number of viewing hours. The apparatus also has the capability to inhibit viewing at selectable times of the day. However, the apparatus suffers from the disadvantage described above inherent in switching the televisions power on and off. Furthermore, the apparatus is very complex and expensive, containing over 30 pushbuttons and switches. The apparatus' display is numeric, not graphical, resulting in a display that is more difficult for children to understand. The password entered by the children to turn on the television must be entered on a numeric keyboard, which is difficult for young children to use.

The apparatus described in the Beier patent also lacks an override capability to permit the parent to watch television or disable watching of television independently of the childrens' viewing time. Furthermore, the apparatus lacks the ability to program different viewing time limits for each day of the week. Also, the apparatus is not capable of calculating and displaying the total hours and average hours viewed by each child.

A limitation shared by all of the devices discussed above, and resolved by the invention described herein, is dependence on 120 volts AC for operating power. This requires that these devices be re-programmed whenever a power outage occurs. Another disadvantage associated with use of 120 volts AC power is that additional hardware is required for transforming the AC power to DC, regulating the internal supply voltage, etc.

SUMMARY OF THE INVENTION

The present invention provides a video control system which overcomes the disadvantages and the limitations discussed above. The system uses low-power components and is designed battery-powered operation. A preferred embodiment of the system will run for one year on standard C-size batteries, which eliminates the vulnerability to power outages and eliminates the hardware expense associated with 120 volts AC power.

In accordance with the invention there is provided a video control system for monitoring and controlling the viewing time of a plurality of viewers watching a video monitor (e.g. a television set). The control system is capable of disabling viewing when a predetermined viewing time has expired. The video control system in one embodiment comprises:

(a) memory circuit means having the capacity for semipermanently storing an assigned individual password for each viewer, a predetermined viewing time associated with each viewer, the remaining viewing time associated with each viewer, and blocked times during which viewing is prohibited;

(b) control means for actuating viewing of the video monitor by switching an RF input signal or video input signal on and off;

(c) display means for displaying information recorded in the memory circuit means;

(d) processing means including:
(1) clock means by which the current time of day is calculated and used for system timing;
(2) polling means for comparing entered passwords to the predetermined passwords to determine if the viewer's password is valid;
(3) comparing means for comparing the predetermined blocked times to the current time to determine if viewing is blocked;

(4) monitor means for monitoring each viewer's time remaining; and (3) accumulating means for accumulating each viewer's total viewing hours; and (e) input means by which each of the viewers can enter their assigned password, by which the viewers select information to be displayed and by which the parents can program the memory circuit means.

The display means is adapted to display the viewer's starting time allowance, the remaining allowance, blocked times, and total viewing time. Thus, the video control system can be programmed for each viewer's starting allowance, remaining allowance, blocked times, and individual password.

The video control system includes three operating modes: Child Mode, Program Mode, and Locked ON/OFF Mode. In the Child Mode, children can view the television or video monitor if they have time remaining in their viewing allowance and viewing is not blocked. In the Program Mode, the parent can program the device. In the Locked ON/OFF Mode, viewing is either enabled (locked on) or disabled (locked off) independently of the children's remaining times.

The system enables or disables viewing of the television by switching on or switching off the television's RF or video input signal, thus avoiding the problems inherent in turning programmable television on and off. Furthermore, the device can be embodied in a compact device which can be readily attached to any television set without modification of the television set or incorporation into the television set itself.

The system requires only nine pushbuttons, four of which are color coded (red, green, blue and yellow) to simplify usage by children. The other three buttons used by the children have symbols on them: an UP arrow, a DOWN arrow and a RIGHT arrow. These buttons greatly simplify operation by children compared to the device described in U.S. Pat. No. 4,348,696 (Beier) which has a multitude of complex pushbuttons and a numeric keypad. With the system of the present invention, a pre-school child who is not familiar with numbers but who is familiar with colors can easily operate the device. This is a significant advantage and it broadens the utility of the video control system of this invention.

The two remaining buttons on the device are for the parents' use only and are labeled PARENT and SELECT. The display, in addition to displaying numbers, also shows graphical symbols to permit children to easily understand and use the device. For example, a picture of a clock is illuminated when the current time is shown on the numerical display.

The device provides each of a predetermined number of children with a viewing allowance (time limit) that is programmable for each day of the week. For example, one child might be allowed to watch television one hour per day Monday-Friday and two hours per day on Saturday and Sunday. Another child might be allowed two hours per day on weekdays with no viewing allowed on weekends. This is in contrast to the device described in U.S. Pat. No. 4,348,696 (Beier), which requires that a child must have the same time limit each day of the week.

While the system and device described in the drawings herein supports use by four children, the system can easily be extended to support more children (e.g. eight children). Limiting support to four children, however, is more cost effective and will cover a majority of the home market.

Each child is provided with his own individual password which he uses to enable viewing. The password is entered by pushing one to four of the colored buttons, as programmed by the parent. When viewing is enabled, the video system displays and decrements the child's remaining viewing time. When the child's viewing time is exhausted, the input signal to the television is switched off by the device, preventing further viewing of the television. The power to the television set is not interrupted.

The device can be programmed with a unique set of hours for each child during which viewing is prevented. These are called Blocked Times. In contrast to the device of U.S. Pat. No. 4,348,696, which supports only one contiguous group of hours which apply to all days during which viewing is blocked, the system of the present invention allows, on an half hour by half hour basis, viewing to be blocked or not blocked. Furthermore, each day of the week can have a unique set of Blocked Times. For example, a child's viewing might be blocked on weekdays from 6:00–7:30 AM and from 3:30–5:00 PM but not blocked at all on weekends.

An override capability, not described or provided by U.S. Pat. No. 4,348,696, is provided herein which permits the parent to view the television regardless of the viewing time remaining for the children. Furthermore, the parent can disable all viewing of the television independently of the children's remaining viewing time.

Unlike the device of U.S. Pat. No. 4,348,696, the system of this invention permits each child's total viewing hours to be accumulated (up to 9,999 hours) and monitored over any desired period. Furthermore, the invention calculates and displays the average number of hours per day that each child views the television.

Another aspect of this invention compared to the prior art is that mechanical anti-tamper devices are not provided and are not required. For example, many of the earlier devices which switch the television's 120 volts AC power have means to capture and lock the television's power cord so that children cannot remove the power cord and plug it into a wall receptable, bypassing the control device. However, such security measures significantly increase the cost of these devices. Furthermore, in the large majority of cases, extraordinary security precautions are not required. Most children will not attempt to defeat the device and will operate within the viewing guidelines established by the parents and enforced by the system.

The video control system of this invention is useful not only for controlling viewing of broadcast television but is also useful in controlling usage of television for the purpose of viewing video cassettes, viewing cable television, using video games, etc.

DESCRIPTION OF THE PREFERRED EMBODIMENT

Figure 1:
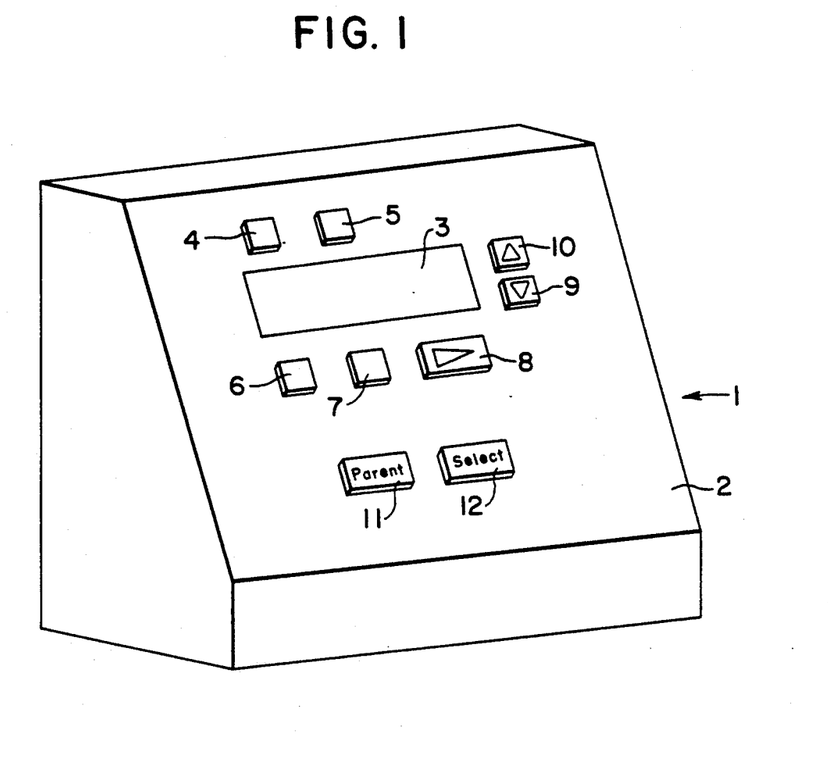
FIG. 1 is a front perspective view of a preferred embodiment of the video control device of the present invention.
Figure 2:
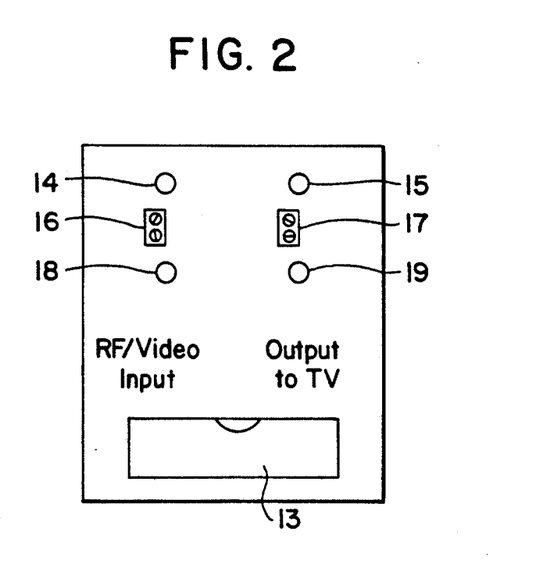
FIG. 2 is a rear view of the device of FIG. 1.
Figure 3:
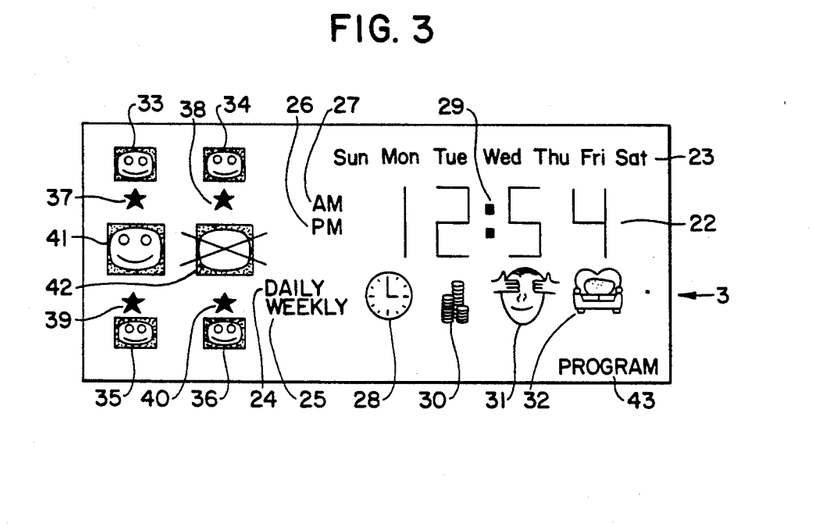
FIG. 3 is an enlargement of the Liquid Crystal Display shown in FIG. 1.

Referring now to the drawings, a preferred embodiment of the video control system of the present invention is shown in FIGS. 1 and 2. The system 1 shown includes a case 2, a display 3 and nine pushbuttons 4–12 described below. FIG. 3 shows the display 3 in more detail.

Referring to FIG. 2, the rear compartment 13 houses the batteries (e.g. two C size batteries). Connector 14 is connected to the RF signal source, which may originate from an antenna, a video cassette recorder, a video game, etc. Connector 15 is the output of the device and connects to the television's RF input connector. Connectors 14 and 15 are electrically and mechanically compliant with the RG-59 interface. Connectors 16 and 17 support interfacing to television sets which utilize 300 ohm twin-lead RF input. For television which utilize a video phono jack interface, connectors 18 and 19 are provided.

Figure 4:
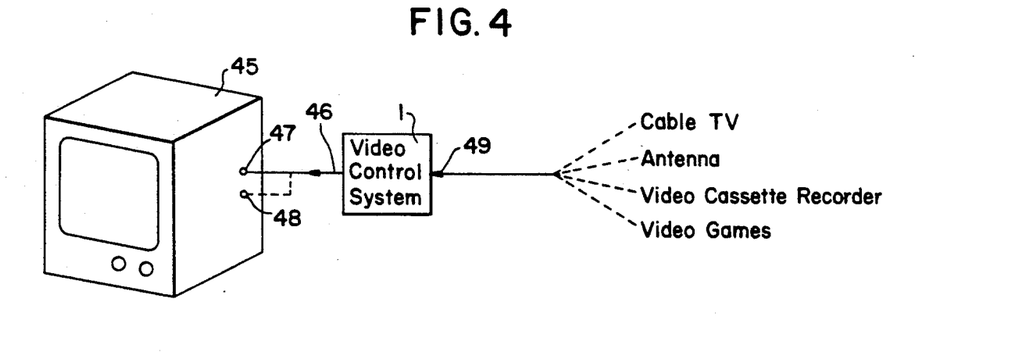
FIG. 4 depicts how the video control device interfaces to multiple sources of RF and video signals.

FIG. 4 shows how the video control system 1 may be connected to different signal sources. The input signal 49 to the video control system may originate from an antenna, from cable TV, from a video cassette recorder, a video game, etc. The output 46 from the video control system is connected to the RF input connector 47 of a television, or, in the case of a television monitor which supports video input, to the video input phono jack 48.

Figure 5:
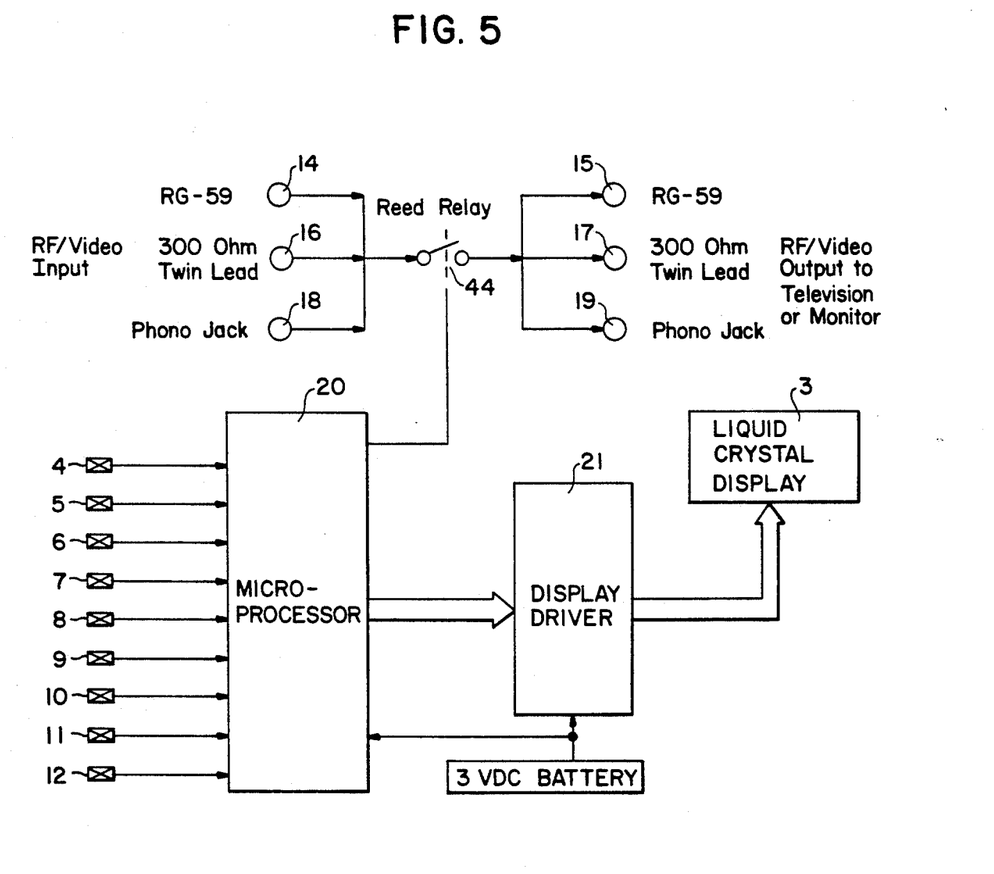
FIG. 5 is a block diagram of the electrical circuitry of the device.

The device or system 1 also includes a circuit board (not shown) which contains the electrical circuitry. Referring to FIG. 5, an electrical block diagram of the circuitry of the device 1 is shown. The circuitry comprises two major components, a single-chip microprocessor 20 which contains internal read only memory (ROM) and internal random access memory (RAM) and a liquid crystal display driver integrated circuit 21 which interfaces from the microprocessor to the liquid crystal display 3, hereafter called the "display". A reed relay 44 performs the signal switching function to enable or disable viewing of the television. The microprocessor 20 and display driver 21 are commercially available components that may be purchased from various manufacturers such as Intel, Inc., and Signetics, Inc. The ROM internal to the microprocessor 20 is programmed at the microprocessor's manufacturing facility to contain the program sequences that provide the various functions of the control device 1 as described and illustrated herein. The programming of the microprocessor is within the skill of the art and involves conventional techniques ordinarily used by programmers.

The display 3 comprises the following elements: A Numeric Display 22, seven Day Annunciators 23, a Daily Annunciator 24, a Weekly Annunciator 25, a PM Annunciator 26, an AM Annunciator 27, a Clock Symbol 28, an Allowance Symbol 30, a Blocked Times Symbol 31 and a Viewing Summary Symbol 32. Four Child ON Symbols are provided, the Red Child ON Symbol 33, the Green Child ON Symbol 34, the Blue Child ON Symbol 35 and the Yellow Child ON Symbol 36. Four Child Display Symbols are provided, the Red Child Display Symbol 37, the Green Child Display Symbol 38, the Blue Child Display Symbol 39 and the Yellow Child Display Symbol 40. A Parent ON Symbol 41 and a Parent OFF Symbol 42 are provided. A Program Mode Annunciator 43 is provided.

The internal RAM of the microprocessor 20 is used to store the viewing time limits, the times during which viewing is blocked, the children's individual passwords, etc. Because all data used by the device is stored in this RAM and recalled from this RAM, references to each individual data item in the following text will not repeat references to this RAM for data storage and recall.

The front panel buttons 4–12 interface directly to the microprocessor 20. Likewise, the liquid crystal display driver integrated circuit 21 is connected directly tot he microprocessor 20.

Figure 6:
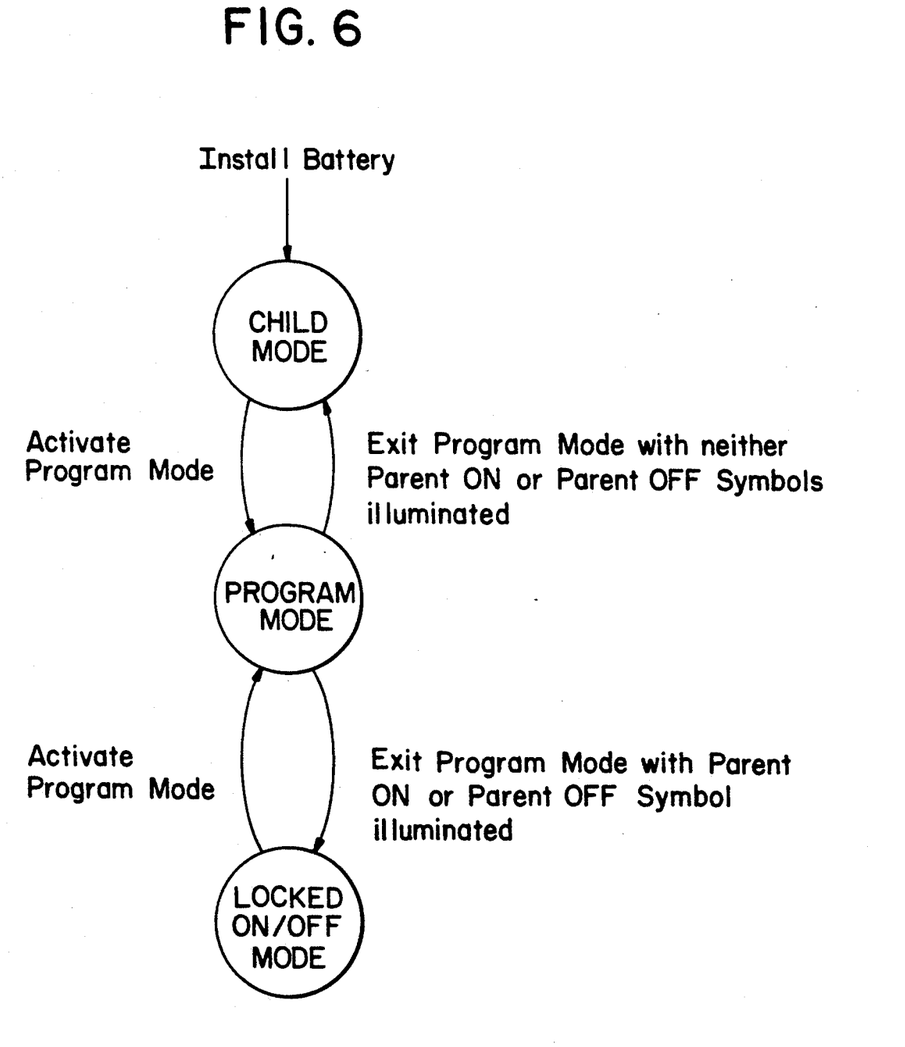
FIG. 6 is a state diagram illustrating the three different operating modes.

The device has three operating modes: Child Mode, Program Mode and Locked ON/OFF Mode. FIG. 6 shows these three Modes and the sequences which cause transitions between these Modes. In Child Mode, children can enable viewing of the television if they have time remaining in their viewing allowance and viewing is not blocked. In Program Mode, the parent can program the device. In Locked ON/OFF Mode, viewing is either enabled (Locked ON) or disabled (Locked OFF) independently of the childrens' remaining times.

In Program Mode, the parent provides each child with a unique amount of viewing time called the Starting Allowance. The Starting Allowance can be programmed to be available on a daily basis (potentially different for each day of the week) or on a weekly basis (a lump sum for the entire week). A daily allowance is indicated by illumination of the Daily Annunciator 24 while a weekly allowance is indicated by illumination of the Weekly Annunciator 25. A password is assigned to each child by the parent which is used by the child to enable viewing of the television. While the child is watching television, the viewing time remaining, called the Remaining Allowance, is decremented and displayed on the Numeric Display 22. When the Remaining Allowance reached 0 on the Numeric Display 22, viewing is automatically disabled.

Whenever the Numeric Display 22 is showing the child's Starting Allowance or Remaining Allowance, the Allowance Symbol 30 is illuminated. When the Starting Allowance is being displayed on the Numeric Display 22, the Allowance Symbol 30 is a tall stack of coins, indicating that the child has his full viewing allowance. When the Remaining Allowance is being displayed on the Numeric Display 22, the Allowance Symbol is a small stack of coins, indicating that the child has less than his full viewing allowance remaining. When the Numeric Display is displaying some other quantity of data besides the Starting Allowance or Remaining Allowance, the Allowance Symbol is turned off.

The parent also programs the time and day(s) during which viewing is prevented, called Blocked Times. Blocked Times can be programmed in half hour increments from 6:00 AM to 10:00 PM and in one hour increments from 10:00 PM to 6:00 AM. The one hour increments from 10:00 PM to 6:00 AM provide adequate night time coverage while simplifying programming. Blocked Times can be unique for each child and can be different for each day of the week. For example, one child might have Monday-Friday blocked from 7:00-8:00 AM and from 3:00-5:00 PM while another child might have 7:00 AM-9:00 PM blocked on weekends. When Blocked Times are shown on the Numeric Display 22, the Blocked Times Symbol 31 is illuminated.

Blocked Times not only provide a means to prevent viewing during certain undesirable hours, they also provide a means for parents to arbitrate control of the television between several children. For example, one child's viewing might be blocked from 4:00-5:00 PM while his sibling's viewing is not blocked during this same period. Even though both children may view the television at the same time, the child who is not blocked is being given explicit control of what channel will be viewed. Thus, whenever there is contention between siblings over what channel is viewed, the parent can use Blocked Times to designate who has control of channel selection during the contentious times.

Figure 7:
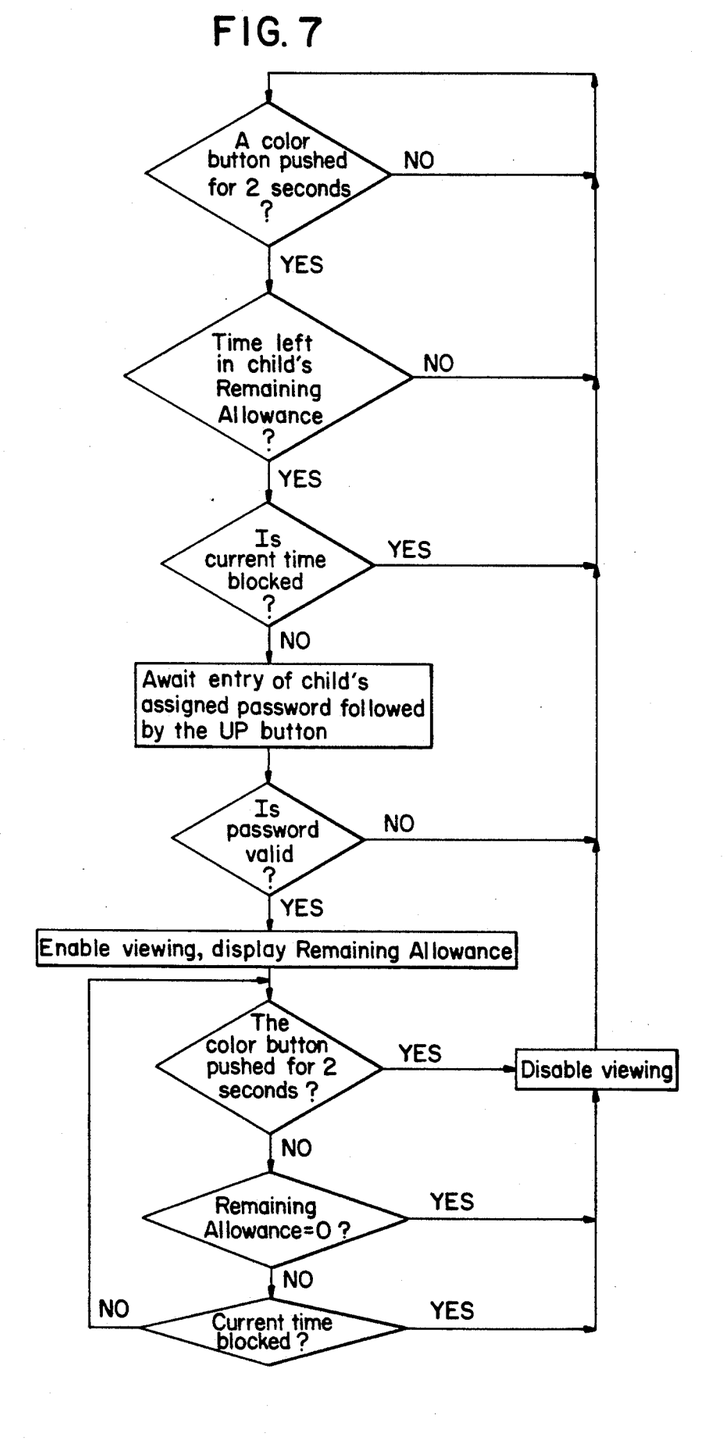
FIG. 7 is a flow chart of the viewing activation sequence.

Each child is assigned one of the four Color buttons 4-7 which he uses to being the sequence to enable viewing. These buttons are the Red button 4, the Green button 5, the Blue button 6 and the Yellow button 7. The sequence to enable viewing is shown in FIG. 7. To begin the viewing activation sequence, the child fist presses his assigned Color button for two seconds. If the child has time left in his Remaining Allowance and if viewing is not blocked at the current time, the video control system prompts the child to enter his password by flashing the appropriate Child Data Symbol, which is immediately adjacent to the asserted button.

Assume that the child has been assigned the Green button 5. In this case, the device responds to assertion of the Green button 5 by prompting for password entry by flashing the corresponding Child Display Symbol 38. The password is entered by pushing one to four Color button 4-7 sequentially. The password is not displayed on the Numeric Display 22 to preserve password security. Example passwords are:

RED—GREEN
    BLUE—RED—BLUE
    YELLOW—BLUE—GREEN—RED
    BLUE After entering the password, the child assigned to the Green button 5 pushes the UP button 10. If the password is correct, television viewing is enabled as indicated by illumination of the Child ON Symbol 34. The Allowance Symbol 30 is illuminated and the Remaining Allowance is shown on the Numeric Display 22 and decremented as described above. In order for viewing to be successfully enabled, several conditions must be met: (1) the child must have time left in his Remaining Allowance, (2) viewing must not be blocked for this particular time and (3) he must enter the correct password. After viewing has begun, the device will disable further viewing if the Remaining Allowance decrements to 0 or if a blocked time is encountered.

The parent can optionally program the device to not require a password of a child. In this case, the device enables viewing of the television whenever the child presses his assigned Color button for two seconds. This feature is especially beneficial for young viewers who may have difficulty remembering a password.

If the first child has enabled viewing, the Numeric Display 22 automatically shows his information as indicated by illumination of the corresponding Child Data Symbol. If a second child desires to review his information, he can tap his assigned Color button (this must be for less than two seconds or also the device will respond as if the second button intends to view the television). This assertion of the second Color button changes the Numeric Display 22 from showing the information of the first child to showing the information of the second child as indicated by illumination of the Child Data Symbol of the second child.

Figure 9:
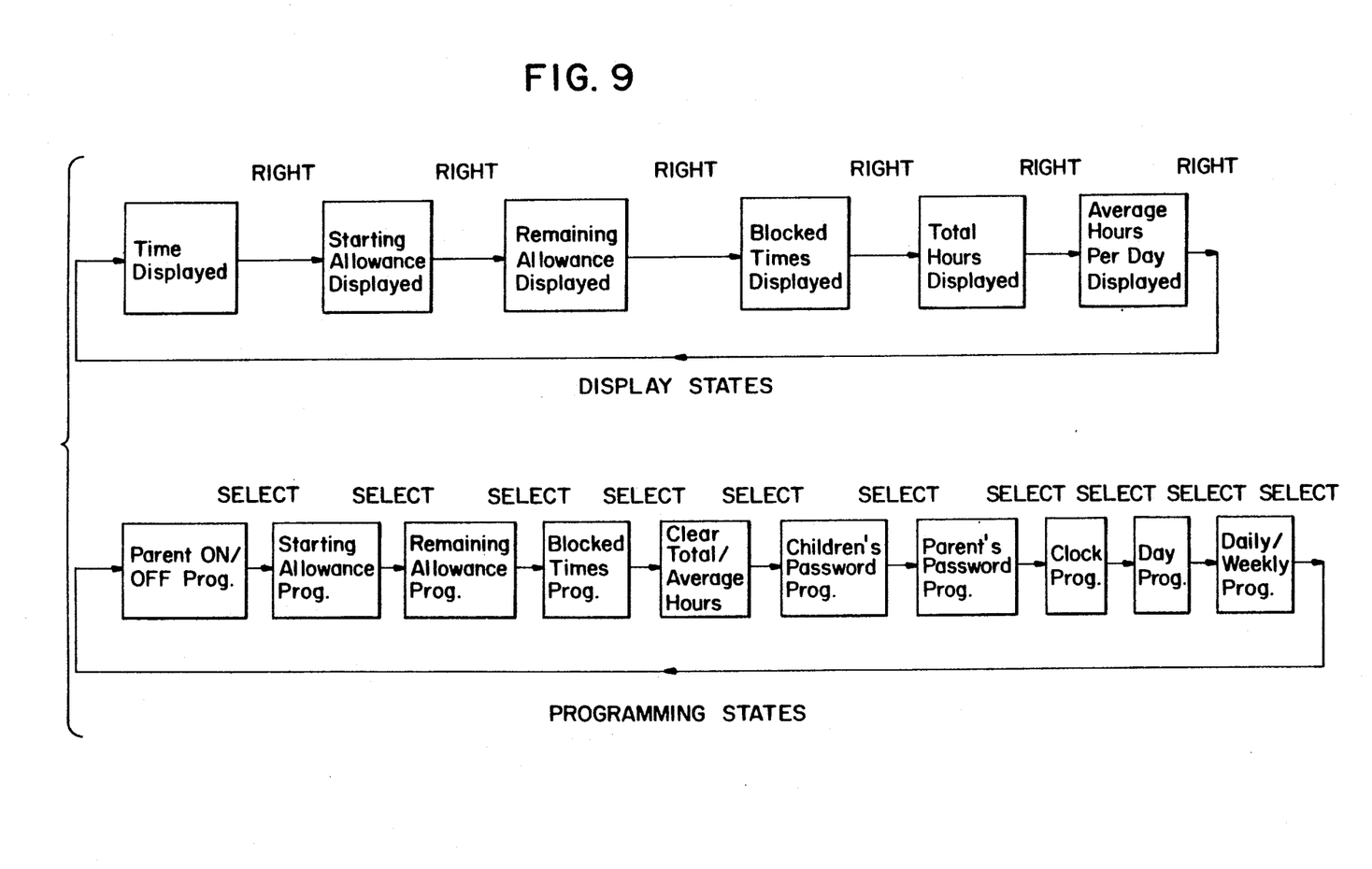
FIG. 9 shows how the video control system is cycled between different display states and different programming states.

A child can use the RIGHT button 8 to review additional information on the Numeric Display 22 as shown in FIG. 9. The data displayed on the Numeric Display 22 steps from item to item each time the RIGHT button 8 is pushed. The items that can be displayed are Time, Starting Allowance, Remaining Allowance, Blocked Times, Total Hours and Average Hours Per Day. When Average Hours are displayed and the RIGHT button 8 is pushed again, the Numeric Display 22 will cycle back to displaying Time.

Whenever any child's information is displayed, either the Daily Annunciator 24 or the Weekly Annunciator 25 is also illuminated. When Time is displayed, the Clock Symbol 28 is illuminated. When either the Starting Allowance or Remaining Allowance is displayed, the Allowance Symbol 30 is illuminated as described previously. When the Blocked Times are displayed, the Blocked Times Symbol 31 is illuminated, which depicts an outline of a face with hands covering the eyes. When the Total Hours or Average Hours Per Day are displayed, the Viewing Summary Symbol 32 is illuminated, which depicts a "couch potato". Display of the colon 29 between hours and minutes signifies display of Average Hours Per Day. Absence of the colon 29 signifies display of Total Hours.

When the Starting Allowance is displayed in Weekly Mode, all days on the Day Annunciators 23 are illuminated, indicating that the allowance applies to the entire week. When Starting Allowance is displayed in Daily Mode, the device automatically cycles through each day of the week (as indicated by each day on the Day Annunciators 23 being illuminated sequentially). Each day is illuminated for two seconds and the Starting Allowance associated with that day is simultaneously displayed on the Numeric Display 22.

When the Remaining Allowance is displayed in Weekly Mode, only the days remaining in the week are illuminated on the Day Annunciators 23. When the Remaining Allowance is displayed in Daily Mode, only the current day is illuminated on the Day Annunciators 23.

When Blocked Times are displayed, the Numeric Display 22 only shows those times which are blocked. The UP button 10 and DOWN button 9 are used to increment and decrement the displayed time to the next later or earlier Blocked Time. When a Blocked Time is displayed on the Numeric Display 22, the day(s) on which this Blocked Time applies are illuminated on the Day Annunciators 23.

When a child is finished viewing television, he presses his assigned Color button for two seconds. This disables viewing of the television unless viewing was previously enabled by one or more other children. In this case, television viewing remains enabled until the last child disables viewing by pressing his assigned Color button for two seconds. When a child presses his Color button for two seconds to disable viewing, decrementing of his Remaining Allowance ceases.

Figure 8:
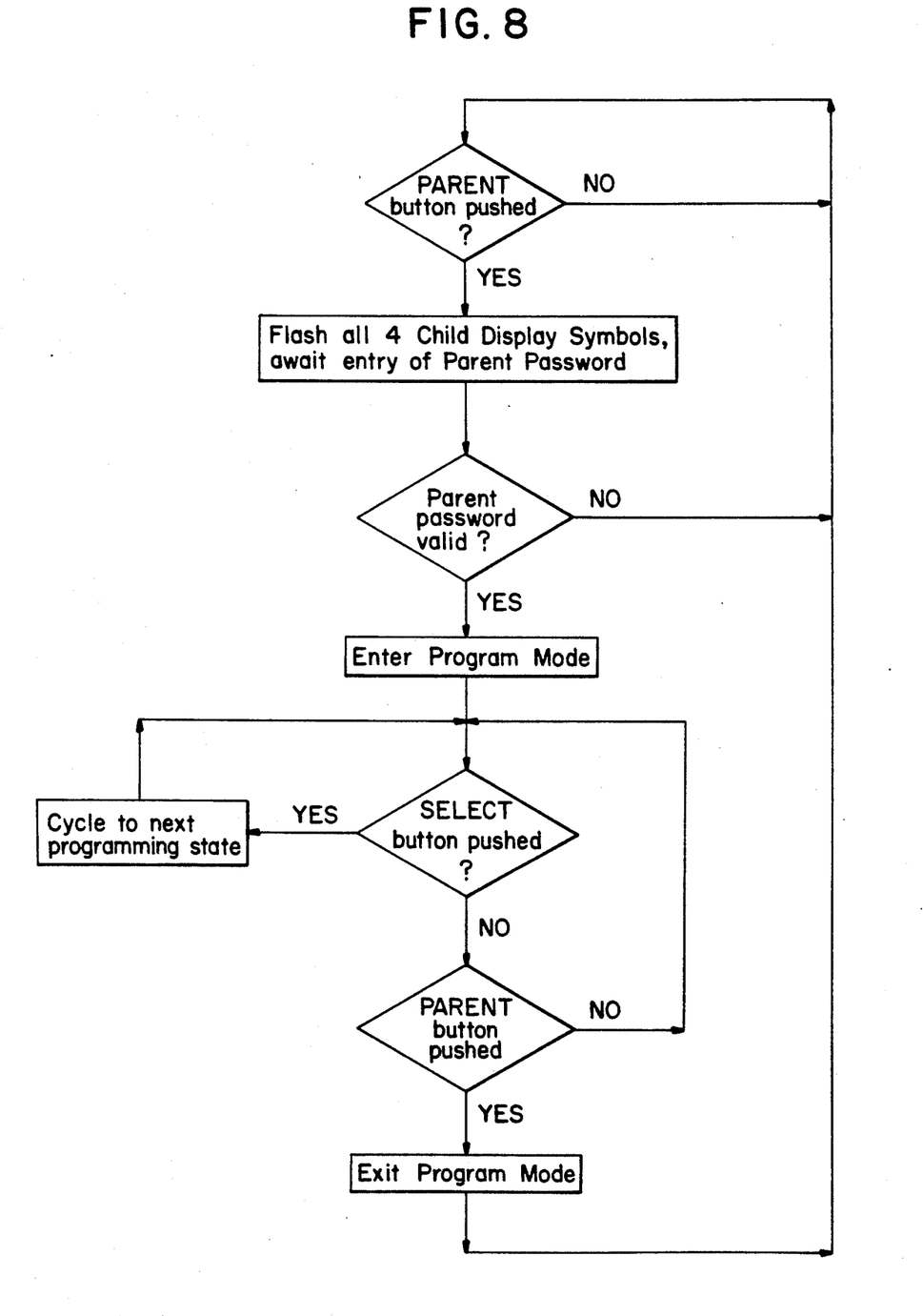
FIG. 8 is a flowchart which illustrates entrance to Program Mode and exit from Program Mode.

To enter Program Mode, the parent first presses the PARENT button 11. The device prompts for the Parent Password by flashing all four Child Display symbols 37-40. The Parent enters his password in the same fashion as the child, by sequentially asserting one to four Color buttons 4-7. Subsequently, the parent again pushes the PARENT button 11. If the Parent Password is valid, the device enters Program Mode as indicated by illumination of the Program Mode Annunciator 43. The flowchart in FIG. 8 shows the sequence to enter and exit Program Mode.

In Program Mode, the parent can program: (1) the current time, (2) the current day, (3) the password for each child, (4) the allowance type, Daily or Weekly, (5) the Starting Allowance for each child and (6) the Blocked Times for each child. In addition, the parent can modify the Remaining Allowance and reset the Total Hours/Average Hours Per Day counters. Furthermore, the parent can disable all viewing, regardless of whether the children have viewing time remaining. Likewise, the Parent can enable viewing whenever he desires. Finally, the Parent can change his own password.

When the battery is first installed, no parent password is required. Therefore, pushing the PARENT button 11 is sufficient to place the device in Program Mode. If the parent prefers more security, he can program a parent password once in Program Mode. This is discussed further below. To exit Program Mode, the parent again pushes the PARENT button 11.

The SELECT button 12 is used in Program Mode to cycle the display 3 through the different programming states as shown in FIG. 9. Various Symbols are illuminated to indicate what items can be programmed in each state. For those items which are programmed uniquely for each child, such as the Starting Allowance, the parent assets one of the Color buttons 4-7 to specify which child's information is being programmed. When Program Mode is entered, Parent ON/OFF Programming is initially selected. Each time the SELECT button 12 is pressed, the next item is selected. After the last item is selected (DAILY or WEEKLY programming), the next assertion of the SELECT button 12 will select Parent ON/OFF Programming again.

The items to be programmed have been carefully ordered based on the likelihood and frequency of programming each item. For example, Parent ON and Parent OFF programming is frequently used to enable or disable all viewing, regardless of the children's remaining viewing allowances. Therefore, these items are available for programming when Program Mode is first entered, as indicated by flashing of both the Parent ON Symbol 41 and the Parent OFF Symbol 42. In this programming state, the parent can push the UP button 10 to enable all viewing (illuminates the Parent ON Symbol 41) or can push the DOWN button 9 to disable all viewing (illuminates the Parent OFF Symbol 42).

Assuming that one or the other of these symbols is illuminated when Program Mode is exited, the device enters Locked ON/OFF Mode, in which the current state of viewing (on or off) is protected from intervention by the children. To exit Locked ON/OFF Mode and return to Child Mode, the parent must re-enter Program Mode and turn off the Picture ON Symbol 41 or turn off the Picture OFF Symbol 42. If neither symbol is on when exiting Program Mode, the device returns to Child Mode.

Upon asserting the SELECT button 12 again, the next item that can be programmed is the Starting Allowance, as indicated by flashing of the Allowance Symbol 30 and one of the Child Display Symbols 37-40. In this case, the Allowance Symbol 30 is a tall stack of coins and the child's current Starting Allowance is displayed on the Numeric Display 22. If the Allowance type is Weekly, the UP button 10 and DOWN button 9 can be used to increment or decrement the displayed Starting Allowance as desired. If the Allowance type is Daily, the RIGHT button 8 is used to select the day to be programmed, followed by use of the UP button 10 or DOWN button 9 to increment or decrement that day's Starting Allowance. In this manner, the Starting Allowance for each day can be programmed.

Upon asserting the SELECT button 12 again, the next item that can be programmed in the Remaining Allowance, as indicated by flashing of the Allowance Symbol 30 and one of the Child Display Symbols 37-40. In this case, the Allowance Symbol 30 is a small stack of coins and the child's current Remaining Allowance is displayed on the Numeric Display 22. Programming of the Remaining Allowance is not normally required; however, support for programming the Remaining Allowance is provided to permit temporary adjustments to the Remaining Allowance such as when a child might need a few additional minutes to finish watching a program.

Upon asserting the SELECT button 12 again, the next item that can be programmed are the Blocked Times, as indicated by flashing of the Parent ON Symbol 41 and the Parent OFF Symbol 42. The following Blocked Times capabilities are provided: (1) A quantity of blocked periods can be programmed for each child during which viewing is prevented; the starting time and ending time of each period can be programmed with half hour resolution, (2) Any day or days of the week can be blocked without having to program specific blocked periods, (3) The blocked periods for any day or days of the week can be overridden and viewing enabled without having to change the individual blocked periods.

When Blocked Times programming is first selected, the UP button 10 or DOWN button 9 are used to select which of the Blocked Time capabilities described above is to be programmed. When the desired capability is selected, the RIGHT button 8, the UP button 10 and DOWN button 9 are used to program the desired capabilities. To program a blocked period, the first assertion of the RIGHT button 8 results in display of the current beginning time for the selected blocked period. The UP button 10 and DOWN button 7 are used to increment or decrement this beginning time. The next assertion of the RIGHT button 8 results in display of the current ending time for the selected blocked period. The UP button 10 and DOWN button 9 are used to increment or decrement the ending time for the blocked period. The next seven assertions of the RIGHT button 8 select from among the seven days of the week which can be blocked (as indicated by flashing of one of the days in the Day Annunciators 23). The UP button 10 enables the previously programmed blocked period on the selected day. The DOWN button 9 disables the previously programmed blocked period on the selected day.

If the capability to block entire days or to override the blocked periods on one or more days is selected, the RIGHT button 8 is used to select the desired day on the Day Annunciators 23. The UP button 10 and DOWN button 9 are used to either block an entire day (Parent OFF Symbol 42 illuminated) or override any blocked periods (Parent ON Symbol 41 illuminated).

Upon asserting the SELECT 12 button again, the next item that can be programmed is the Total Hours-/Average Hours Per Day counter as indicated by flashing of the Viewing Summary Symbol 32. The only operation the Parent can perform is clearing of a child's Total Hours/Average Hours Per Day counter to 0, which is performed using the DOWN button 9.

Upon asserting the SELECT button 12 again, the next item that can be programmed is a child's password, as indicated by flashing of one of the Child Display Symbols 37-40 and display of his current password on the Numeric Display 22. The current password is displayed based on assignment of the numbers 1, 2, 3 and 4 to the Red, Green, Blue and Yellow buttons, respectively. The parent presses one to four of the Color buttons 4-7 to enter a new password. If a password of "0000" is desired (meaning a password is not required of the child), the DOWN button 9 is asserted.

Upon asserting the SELECT button 12 again, the next item that can be programmed is the parent's password, as indicated by flashing of all Child Display Symbols 37-40 and display of the Parent's current password on the Numeric Display 22. The parent presses one to four of the Color buttons 4-7 to enter a new parent password. If a password of "0000" is desired (meaning a password is not required of the parent to enter Program Mode), the DOWN button 9 is asserted.

Upon asserting the SELECT button 12 again, the next item that can be programmed is the Clock as indicated by flashing of the Clock Symbol 28. To program the clock, the RIGHT button 8 is used to select hours or minutes for programming (as indicated by flashing of the hours or minutes digits) and the UP button 10 and DOWN button 9 are used to change the selected digits.

Upon asserting the SELECT button 12 again, the next item that can be programmed is the day of the week, as indicated by flashing of the current day on the Day Annunciators 23. To program a different day, the RIGHT button 8 is used to select the desired day.

Upon asserting the SELECT button 12 again, the final item that can be programmed is the type of Allowance, either Daily or Weekly, as indicated by flashing of the Daily Annunciator 24 or the Weekly Annunciator 25. To select a different allowance type, the RIGHT button 8 is used to toggle between the two allowance types.

After programming a child's Blocked Times and Starting Allowance, the video control system permits the parent to copy the programmed Blocked Times and Starting Allowance to one or more other children. This feature eliminates the need to program these items separately for each child. The first step to copy information between children is to use the SELECT button to select either Blocked Times or Starting Allowance for copying. Next, the Color button of the first child (whose data is to be copied to a second child) is pressed. While continuing to press the first child's Color button, the Color button of the second child is "tapped" (pressed and released). This tap transfers the Blocked Times or Starting Allowance from the first child to the second child. Subsequently, the first child's Color button can be released. In this manner, information can be copied from one child to one or more other children. After the copy operation is completed, the parent can remain in Program Mode if he desires to modify the copied information to better suit the needs of that particular child.

While the preferred embodiment of the video control system 1 is battery powered for lower cost and immunity to power failures, this is not essential and the video control system could instead be powered with 120 volts AC, preferably with a battery back-up system to protect against intermittent power failures.

Although the video control system 1 described herein is separate and apart from the controlled television set 45, this is not essential and alternately the video control system 1 could be incorporated into the design of television sets, especially those sets which have pushbutton inputs and digital electronics. In such a design, the television's screen could be used to display the video control system's output information and operation would be possible using the television's pushbuttons and, if available, the television's remote control unit.

Furthermore, although the video control system 1 described herein does not support selective channel blocking, this feature could be supported in the system of this invention. This feature would permit parents to inhibit viewing by children of specified channels, either on a continuous basis or as a function of time. This feature, combined with the viewing allowance supported by the system of this invention, would ensure parents complete control of their children's viewing habits.

Implementation of selective channel blocking would be dependent on whether the video control system is separate and apart from the control television set or is incorporated into the television set. If the video control system is separate and apart from the television, selective channel blocking could be done by generation of an interference signal to inhibit reception of selected channels. If the video control system is incorporated into the television, the television's channel selection mechanism could be designed to permit parents to prohibit selection of predetermined channels. Other variants are possible without departing from the scope of the present invention.

What is claimed is:

1. A television viewing control system for monitoring and controlling the viewing time of a plurality of viewers watching a television set and disabling viewing when a predetermined viewing time has expired, said control system comprising:
   (a) memory circuit means for semipermanently storing an assigned individual password for each of said viewers, a predetermined viewing time quota associated with each of said viewers, the portion of said viewing time quota remaining for each of said viewers, and blocked times for each of said viewers during which viewing is prohibited;
   (b) a control means for actuating viewing of the television by switching an RF input signal or video input signal on and off;
   (c) a display means for displaying information recorded in said memory circuit means; said display means comprising a plurality of display elements for simultaneously displaying information recorded in said memory circuit means;
   (d) processing means including:
   (1) clock means for calculating the current time of day and the day of the week, and
   (2) polling means for comparing an entered password to said assigned individual passwords to determine if said entered password is valid, and
   (3) comparing means for comparing the predetermined blocked times to said current time of day to determine if viewing is blocked;

(4) monitor means for monitoring each viewer's time remaining;

(5) accumulating means for accumulating each viewer's total viewing hours;

(e) input means by which each of said viewers can enter their said assigned password, by which said viewers select information to be displayed and by which said memory circuit means can be programmed;

(f) means for selectively blocking designated television channels;

wherein said processing means is operably connected to said control means for selectively actuating or deactuating said RF in put signal or video input signal to said television set; wherein said system enables the designation of different viewing time quotas for each of said viewers each day; and wherein said system further comprises override means for controlling viewing of said television set independent of said control means.

2. A television control system as recited in claim 1 wherein said display means is adapted to display said current time of day, the day of the week, which viewer has activated viewing of the television, viewer's viewing time quota, remaining viewing time quota, blocked times, total viewing time, average daily viewing time, daily or weekly.

3. A television control system as recited in claim 1 wherein said system further includes programming means enabling programming of each viewer's, viewing time quota, blocked times and password.

4. A television control system in accordance with claim 1, wherein said system is contained in said television set in a manner such that said information recorded in said memory circuit means may be displayed on said television set.

* * * * *